(12) United States Patent
Uy et al.

(10) Patent No.: US 9,749,390 B2
(45) Date of Patent: Aug. 29, 2017

(54) UICC SMS ROUTING TO DEVICE APPLICATION

(71) Applicant: Verizon Patent and Licensing Inc., Arlington, VA (US)

(72) Inventors: Warren Hojilla Uy, Randolph, NJ (US); Mauricio Pati Caldeira De Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 8 days.

(21) Appl. No.: 14/557,071

(22) Filed: Dec. 1, 2014

(65) Prior Publication Data

US 2016/0157092 A1  Jun. 2, 2016

(51) Int. Cl.
*H04M 3/00* (2006.01)
*H04L 29/08* (2006.01)
*H04W 4/14* (2009.01)
*H04W 76/02* (2009.01)
*H04W 8/20* (2009.01)

(52) U.S. Cl.
CPC ............. *H04L 67/025* (2013.01); *H04W 4/14* (2013.01); *H04W 8/20* (2013.01); *H04W 76/02* (2013.01)

(58) Field of Classification Search
CPC ....... H04W 12/06; H04W 4/001; H04W 4/24; H04W 4/003; H04W 12/08; H04W 12/04; H04W 8/205; H04W 60/06; H04W 60/00; H04W 8/20; H04L 63/0853; H04L 63/0428

USPC ......................................................... 455/419
See application file for complete search history.

(56) References Cited

U.S. PATENT DOCUMENTS

| | | | | |
|---|---|---|---|---|
| 2013/0252584 A1* | 9/2013 | Cuadrat | ............... | H04L 67/125 455/411 |
| 2013/0324079 A1* | 12/2013 | Korkiakoski | ......... | H04M 15/70 455/406 |
| 2014/0094161 A1* | 4/2014 | Saito | ..................... | H04W 88/06 455/419 |

* cited by examiner

*Primary Examiner* — Kwasi Karikari (57) ABSTRACT

Information regarding the status of an update to a universal integrated circuit card (UICC) being performed across a mobile wireless communication network is provided to a server involved in the update process and/or to a user of the mobile communication device having the UICC. The UICC update server sends an update trigger to the mobile communication device, and the UICC initiates establishment of a communication link to receive the update. The UICC further causes a baseband processor of the mobile communication device to send a proof-of-receipt of the update trigger by short message service (SMS) messaging back to the update server. Additionally or alternatively, the UICC causes the baseband processor to send a wakeup message to a mobile device application executing on the mobile device. The wakeup message includes status information relating to the UICC update which can be provided to a user of the mobile device.

16 Claims, 6 Drawing Sheets

UICC SMS ROUTING TO DEVICE APPLICATION

BACKGROUND

In recent years, the capabilities and functionalities of mobile communication devices have expanded and increased in popularity, around the world. In addition to providing mobile wireless communication service for voice calls, mobile messaging services (e.g., text and/or multimedia), and data communications, many advanced mobile communication devices can now be used to perform mobile payments, to use advanced network features (e.g., high definition voice service), and the like.

Mobile communication devices rely on universal integrated circuit cards (UICCs) for mobile communication network authentication, among other purposes. An example of a UICC is a subscriber identification module (SIM) card, and UICCs are commonly referred to as SIM cards. As part of authenticating a mobile communication device for communication on a mobile wireless communication network, a UICC securely stores a mobile device number (MDN), a mobile identification number (MIN), an international mobile subscriber identity (IMSI), and/or a mobile subscriber integrated services for digital network (MSISDN). In addition, UICCs can be used for other authentication and operational purposes. For example, a UICC can securely store a roaming list and/or other operational data for supporting a device's operation on a mobile wireless communication network. A UICC can further securely store authentication data for use in mobile payments, as well as user data (e.g., address book information) for retrieval on a mobile communication device.

UICCs are generally preloaded with operational data prior to shipping to customers, such that a new UICC shipped to a customer is generally already loaded with home and roaming network information including, for example, identification for a home public land mobile network (HPLMN), an operator public land mobile network (OPLMN), an enhanced preferred roaming list (ePRL), and the like. However, the data stored on a UICC may need to be updated upon activation of the UICC or during use of the UICC. For example, an MDN, MIN, IMSI, or MSISDN may need to be provided at the time of activating a UICC; updated home network and roaming list information may need to be provided upon a customer signing up for international roaming mobile wireless service; mobile payment information may need to be provided upon the customer signing up for mobile payment services or updating mobile payment information; or the like. Reliable methods for remotely updating the information stored on a UICC are therefore needed.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to providing confirmation of updates made to universal integrated circuit cards (UICCs) across mobile wireless communication networks. The confirmation is provided to a network system or to a mobile device user, and enables the system or user to determine whether a UICC update is proceeding appropriately or why a UICC update was not successful.

According to one method, a mobile communication device receives from a UICC update server a message for triggering an update of data stored in a UICC of the device, the message being received across a mobile wireless communication network. The baseband processor of the transceiver of the mobile communication device identifies the received message as a UICC update trigger, and forwards the message to the UICC. In response to receiving the message, the UICC triggers the sending of a proof-of-receipt message back to the UICC update server. Specifically, the UICC sends to the baseband processor a response message identifying the message for triggering the update, and the baseband processor generates and transmits across the mobile wireless communication network a proof-of-receipt message as a short message service (SMS) message identifying the received message for triggering the update.

Additionally or alternatively, the mobile communication device may provide a wakeup notification to a mobile device application executing thereon. In this case, in response to receiving the UICC update trigger message from the UICC update server, the UICC triggers the waking up of a mobile device application associated with the UICC update. Specifically, the UICC transmits to the baseband processor a response message identifying one application installed on the mobile communication device that is associated with the received update trigger. The baseband processor then triggers the wakeup of the application, and provides the application with payload information indicative of a status of the UICC update process. The application can then provide a notification to a user of the mobile communication device relating to the status of the UICC update process, and/or can provide such a notification back to the UICC update server or to an administrator of the mobile wireless communication network.

Reference now is made in detail to the examples illustrated in the accompanying drawings and discussed below.

Figure 1:
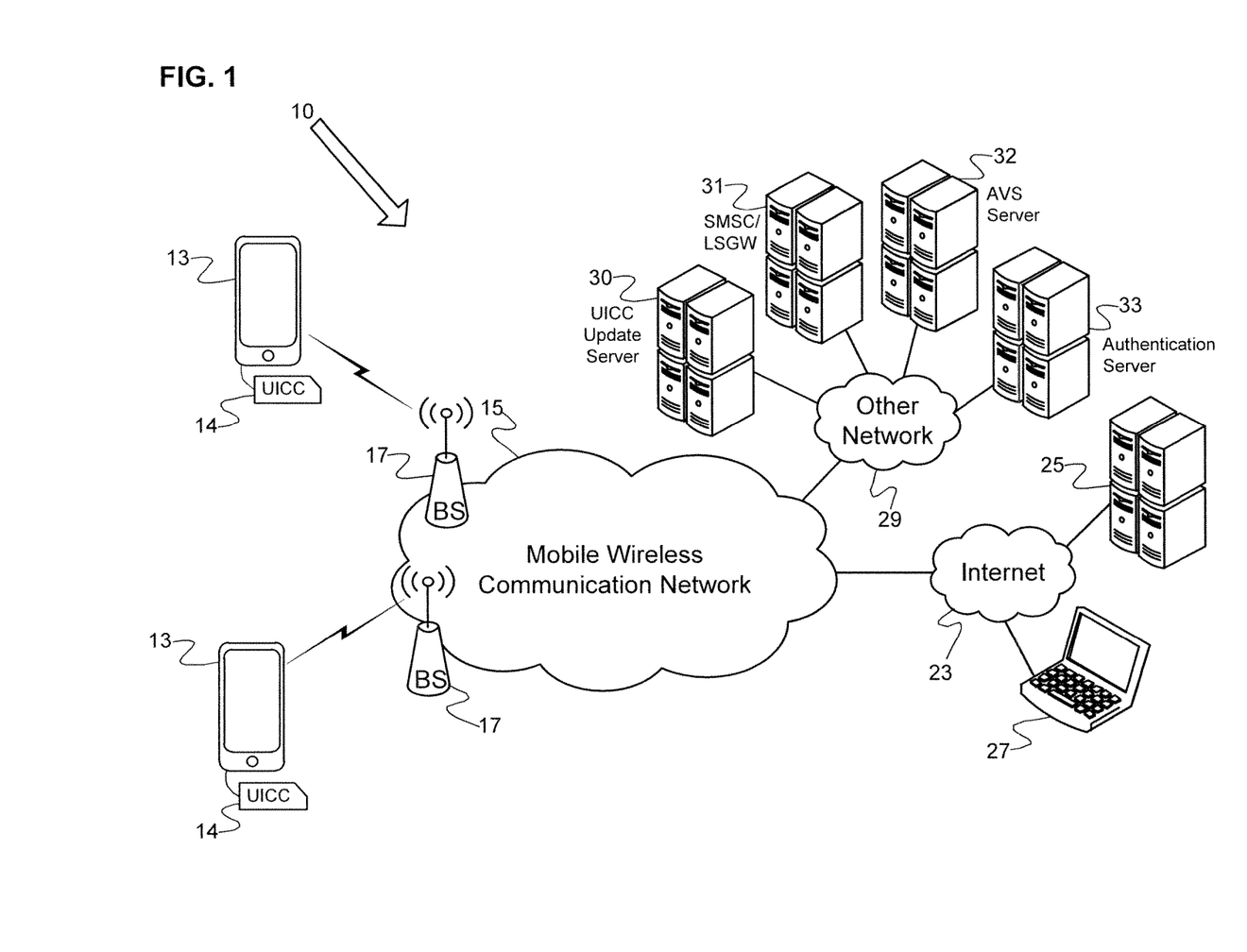
FIG. 1 is a high-level functional block diagram of an example of a system of networks/devices that provide various communications for mobile devices and support an example of the enhanced UICC updating service.

FIG. 1 illustrates a system 10 offering a variety of mobile communication services, including communications for updating data stored on a UICC 14 of a mobile wireless communication device 13. The example shows simply two mobile wireless communication devices 13 communicating through a mobile wireless communication network 15. The mobile devices 13 are examples of mobile wireless communication devices that may be used with the UICC updating service, and each mobile device 13 has a UICC 14 that is removably or permanently mounted therein. The network 15 also provides communications for many other devices and users that do and do not participate in the UICC updating service.

The present techniques may be implemented in any of a variety of available mobile networks 15 and/or on any type of mobile device compatible with such a network 15, and the drawing shows only a very simplified example of a few relevant elements of the network 15 for purposes of discussion here. The network 15 provides mobile wireless communications services to devices via a number of base stations (BSs) 17, which can each include a base transceiver system (BTS) communicating via an antenna system at the site of base station 17 and over the airlink with one or more of the mobile devices 13 when the mobile devices are within range. The network 15 can be implemented by a number of interconnected networks, including a number of radio access networks (RANs), regional ground networks interconnecting RANs, and a wide area network (WAN) interconnecting the regional ground networks to core network elements. The network 15 carries the user communications and data for the mobile devices 13 between the base stations 17 and other elements with or through which the mobile devices communicate. The network 15 can be formed of multiple distinct mobile wireless communication networks that have overlapping and/or complementary geographical coverage areas, and may include mobile wireless communication networks that are administered by different mobile wireless carriers or service providers.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, the Long-Term Evolution (LTE) or $4^{th}$ generation LTE (4G-LTE) standard, a time division multiple access (TDMA) standard, or other standards used for public mobile wireless communications. The mobile communication devices 13 may be capable of voice telephone communications through the network 15, and for the UICC updating services, the exemplary devices 13 are generally capable of bearer independent protocol (BIP) data communications through the particular type of network 15.

The network 15 allows users of the mobile devices 13 to initiate and receive telephone calls to each other as well as through a public switched telephone network (PSTN). The network 15 typically offers a variety of data services via the Internet 23, such as downloads, web browsing, email, etc. By way of example, the drawing shows a laptop PC type user terminal 27 as well as a server 25 connected to the Internet 23, and the data services provided for the mobile devices 13 via the Internet 23 may be with devices like those shown at 25 and 27 as well as with a variety of other types of devices or systems capable of data communications through various interconnected networks. The mobile devices 13 can receive and execute applications written in various programming languages, as discussed more below.

Mobile devices 13 can take the form of portable handsets, smart-phones, personal digital assistants, or tablet computers, although they may be implemented in other form factors as well. Program applications, including any application involved in the UICC updating service, can be configured to execute on many different types of mobile devices 13. For example, a mobile device application can be written to execute on a binary runtime environment for mobile (BREW-based) mobile device, a Windows Mobile based mobile device, Android, I-Phone, Java Mobile, or BlackBerry based mobile device or the like. Some of these types of devices can employ a multi-tasking operating system.

The carrier or service provider of the mobile wireless communication network 15 generally operates a number of systems that provide ancillary functions in support of the communications services and/or application services provided through the network 15, and those elements communicate with other nodes or elements of the network 15 via one or more private Internet-protocol (IP) type packet data networks 29 (sometimes referred to as an Intranet). Examples of such systems, in this case operated by the network service provider as part of the overall network 15, include one or more application servers 30-32 and a related authentication server 33 for one or more of the application services of servers 30-32.

In the present examples, the application servers 30-32 can include a UICC update server 30 configured to update UICCs 14 of mobile devices 13 on the mobile wireless network 15; a short message service center (SMSC) (or LTE service gateway LSGW) 31 configured to send, receive, and manage short message service (SMS), multimedia message service (MMS), and enhanced message service (EMS) messages across the network 15; and an application verification service (AVS) server 32 configured to verify permissions of applications executing on mobile devices 13 in network 15. A mobile device 13 communicates over the air with a base station 17 and through the traffic network 15 for various voice and data communications, e.g. with application servers 30-32. If the mobile service carrier offers the enhanced UICC updating service, the service may be hosted on a carrier operated application server 30, for communication via the networks 15 and 29. Alternatively, the enhanced UICC updating service may be provided by a separate entity (alone or through agreements with the carrier), in which case, the service may be hosted on an application server such as server 25 connected for communication via the networks 15 and 23. Servers such as 25 and 30-32 may provide any of a variety of common application or service functions in support of or in addition to application programs running on the mobile devices 13. However, for purposes of further discussion, we will focus on functions thereof in support of the enhanced UICC updating service. For a given service, including the enhanced UICC updating service, an application program within the mobile device may be considered as a 'client' and the programming at 25 or 30-32 may be considered as the 'server' application for the particular service.

To insure that the application service offered by servers 30-32 is available to only authorized devices/users, the provider of the application service also deploys an authentication server 33. The authentication server 33 could be a separate physical server as shown, or authentication server 33 could be implemented as another program module running on the same hardware platform as the server application(s) 30-32. Essentially, when any server application (server(s) 30-32 in our example) receives a service request from a client application on a mobile device 13, the server application provides appropriate information to the authentication server 33 to allow server application 33 to authenticate the mobile device 13 as outlined herein. Upon successful authentication, the server 33 informs the server application 30-32, which in turn provides access to the service via data communication through the various communication elements (e.g. 29, 15, and 17) of the network system 10. A similar authentication function may be provided for service(s) offered via the server 25, either by the server 33 if there is an appropriate arrangement between the carrier and the operator of server 25, by a program on the server 25, or via a separate authentication server (not shown) connected to the Internet 23.

Figure 2:
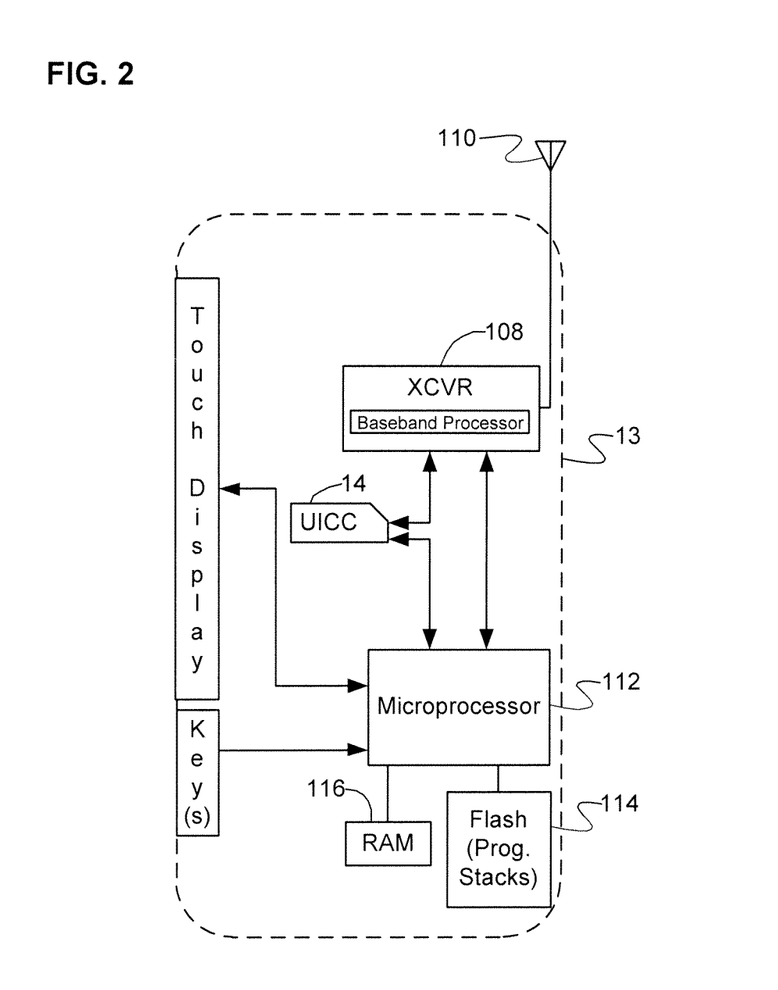
FIG. 2 is a high-level functional block diagram of a mobile communication device as may utilize the enhanced UICC updating service through a network/system like that shown in FIG. 1.

FIG. 2 is a block diagram illustration of an exemplary mobile wireless communication device 13. While the device 13 is shown as a smartphone, the mobile wireless communication device 13 can more generally take the form of a portable handset, personal digital assistant, or tablet computer, although it may be implemented in other form factors as well.

The handset embodiment of the mobile device 13 shown in FIG. 2 functions as a normal digital wireless telephone station. For that function, the device 13 includes a microphone, speaker, and vocoder (not shown). For digital wireless communications, the device 13 also includes at least one digital transceiver (XCVR) 108. In general, the device 13 is configured for digital wireless communications using one or more of the common network technology types. The transceiver 108 provides two-way wireless communication of information, such as vocoded speech samples and/or digital information, via antenna 110 to the mobile wireless communication network 15. The transceiver 108 may also support various types of mobile messaging services, such as short message service (SMS), enhanced messaging service (EMS), and/or multimedia messaging service (MMS). The transceiver 108 includes a baseband processor that controls the operation of the transceiver, including processing of communications received by the transceiver 108 from the network 15 and forwarding of such communications to the appropriate components of device 13 (e.g., to the UICC 14 or the microprocessor 112) and processing of communication received from within device 13 for transmission across the network 15 or to other components of device 13.

The mobile wireless communication device 13 further includes a UICC 14 that is permanently or removably mounted therein, and is used to authenticate the mobile device 13 for communication on the network 15. For this purpose, the UICC 14 is communicatively connected to the transceiver 108. When a communication is received via the network 15 in the transceiver 108, the baseband processor of the transceiver 108 determines whether the communication should be forwarded to the UICC 14 for authentication and/or processing. In response to determining that the communication requires authentication or processing, the communication is forwarded to the UICC 14 for processing. In the alternative, the communication can be sent directly from the transceiver to the microprocessor 112. The UICC 14 can further provide authentication purposes for other purposes, including providing authentication for mobile payment applications for example.

The mobile device 13 includes a user input/output interface including a touch-sensitive display for displaying messages, menus, call related information dialed by the user, calling party numbers, or the like. A keypad and/or the touch-sensitive display enable dialing digits for voice and/or data calls, as well as generating selection inputs, for example.

A microprocessor 112 serves as a programmable controller for the mobile device 13, in that it controls all operations of the mobile device 13 in accord with programming that it executes, for all normal operations, and for operations involved in the enhanced UICC updating procedure under consideration here. In the example, the mobile device 13 includes flash type program memory 114, for storage of various "software" or "firmware" program routines and mobile configuration settings, such as a mobile directory number (MDN), a mobile identification number (MIN), an international mobile subscriber identity (IMSI), and/or a mobile subscriber integrated services for digital network (MSISDN), etc. The mobile device 13 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the UICC 14 provides authentication services for the mobile communication device 13 for communications across the mobile wireless communication network 15, as well as for mobile payment applications and other secure applications. For these purposes, the UICC 14 includes a secure internal memory and a processor. The internal memory stores authentication data, including MDN/MIN/IMSI/MSISDN information for communicating across the network 15. The UICC 14 can additionally store user data, such as address book data. The UICC 14 further stores program code for a plurality of applets. The applets are application programs that execute on the UICC processor, and include applets that perform authentication-related computations and processing. Different applets provide authentication services for different purposes and applications. For example, a mobile wireless applet may provide authentication services for communications across the mobile wireless communication network 15; a mobile wallet applet may provide authentication services for mobile payment services; a mobile roaming applet may provide services relating to authentication while roaming on foreign carriers' mobile wireless communication networks; and the like. The applets are executed on the processor of the UICC 14, and process authentication and other requests received by the UICC 14 from various components of the mobile communication device 13 (e.g., from the baseband processor of the transceiver 108). In response to the processing, the applets trigger the UICC 14 to send response messages to the various components of the mobile communication device 13 (e.g., to the baseband processor of the transceiver 108, or to the microprocessor 112), the response messages commonly including authentication information.

While UICCs are generally preloaded with operational data prior to shipping to customers, the data stored on a UICC 14 including the authentication data and the application data may need to be updated over the course of the useful life of the UICC 14. For this purpose, the UICC update server 30 may be configured to provide updated operational data to UICCs 14 of mobile devices 13 communicating on the network 15 on a regular basis. The updates are communicated wirelessly across the mobile wireless network 15, and enable the UICCs 14 to seamlessly provide upgraded authentication services as new authentication methods are rolled out.

Figure 3:
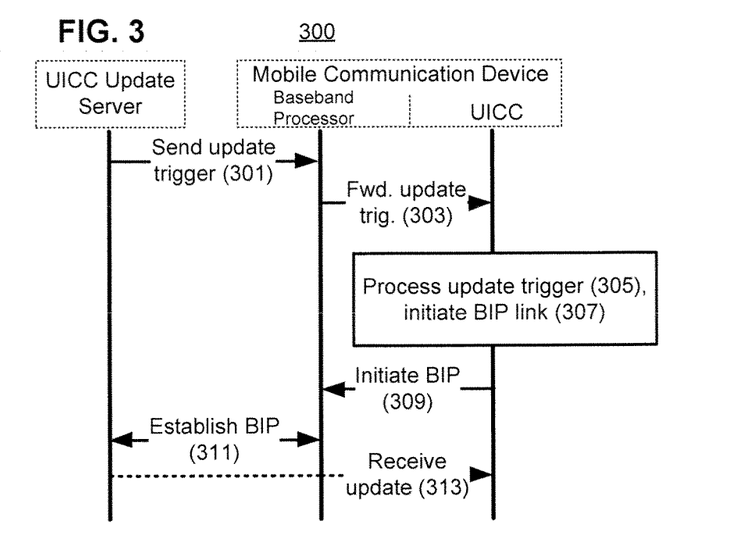
FIGS. 3-6 are communication flow diagrams showing communications involved in updating operational data stored on a UICC across a mobile wireless communication network according to first, second, third, and fourth methods for providing UICC updates.

FIG. 3 is a communication flow diagram showing communications involved in updating operational data stored on a UICC 14 according to a first method 300. The diagram shows communication between a UICC update server 30, such as a SIM over-the-air (OTA) or trusted service manager (TSM) server, and a mobile communication device 13, as well as communications within the mobile communication device 13 between a baseband processor (e.g., a baseband processor of transceiver 108) and the UICC 14.

The method 300 begins with the UICC update server 30 triggering an update of the UICC 14 in step 301. The trigger for updating the UICC 14 may be generated on a periodic basis (e.g., every seven days), in response to determining that the UICC is being initialized for service on the mobile wireless network 15 (e.g., if the UICC is being used on the mobile wireless network 15 for the first time, or if the UICC is being used in a particular mobile communication device 13 for the first time), in response to determining that the mobile communication device 13 is establishing communication with the mobile wireless communication network 15 for the first time after being turned on (e.g., upon boot-up), or the like. As part of triggering an update of the UICC 14, the UICC update server 30 generates and transmits to the mobile communication device 13 the update trigger in step 301. The update trigger can take the form of an SMS wakeup trigger message (e.g., a 3GPP Class 2 binary SMS) which is transmitted by the UICC update server 30 via SMS and is configured to automatically wakeup particular processing on the device 13 to perform the UICC update.

The update trigger message of step 301 is received in the transceiver 108 of the mobile device 13, and is processed by the baseband processor of the transceiver 108. As part of the processing the baseband processor identifies the received message as an update trigger destined for the UICC 14, and forwards the update trigger to the UICC 14 in step 303. In one example, the baseband processor is configured to forward all received SMS messages to the UICC 14 upon receipt, and the update trigger message is therefore automatically forwarded to the UICC 14 in step 303. In another example, the baseband processor processes received messages including SMS messages and, upon determining that a received message is an update trigger message (e.g., a UICC app-directed message), forwards the update trigger message to the UICC 14 in step 303. The determination that a received message is an update trigger can be performed based on a header of an SMS message that identifies the SMS as a UICC update trigger message.

Upon receiving the update trigger, the UICC 14 processes the update trigger in step 305. In particular, in response to receiving the update trigger, the UICC 14 determines that a bearer-independent-protocol (BIP) link should be established across network 15 with the UICC update server 30 such that the UICC 14 can receive the UICC update (including updated UICC operational data) from the UICC update server 30. As such, in step 307, the UICC 14 initiates establishment of a BIP link through the baseband processor with the UICC update server 30. Specifically, in step 309, the UICC 14 instructs the baseband processor to establish a BIP link, and a BIP communication link is established through network 15 with the UICC update server 30 in step 311. The UICC update is received from the UICC update server 30 by the mobile communication device 13 across the BIP link in step 313, and is forwarded to the UICC 14 for storage in the UICC 14.

The UICC update procedure described in relation to method 300 does not generally include fault tolerance or error messaging. As a result, neither a user of the mobile communication device 13 nor a network manager (e.g., a manager overseeing operation of the UICC update server 30) may be able to determine whether a UICC update was completed successfully, or whether the UICC update process failed at any point. For example, neither a user nor a manager may know whether the update trigger was successfully received by the mobile communication device, whether the UICC in turn received the trigger from the baseband processor, whether the update trigger's payload was corrupted during communication and failed to properly cause the initiation of the BIP link, whether the BIP link was successfully established, or whether the UICC update was received across the BIP link. As a result, it may be difficult to determine that an update succeeded, or to determine the reasons for an update's failure and/or for any later malfunction in the mobile device 13 or UICC 14 resulting from the UICC 14 not having been updated.

Figure 4:
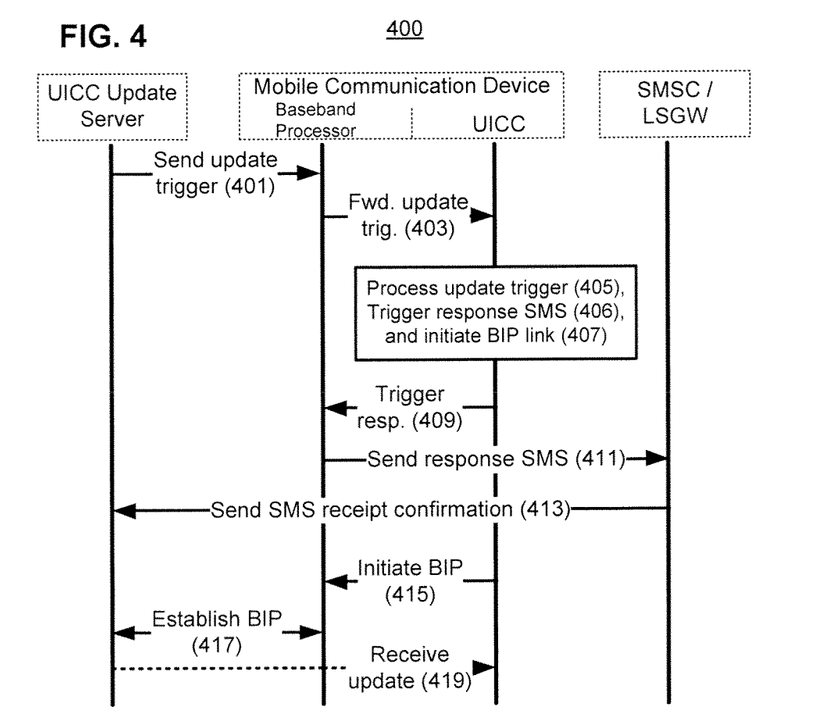
Figure 5:
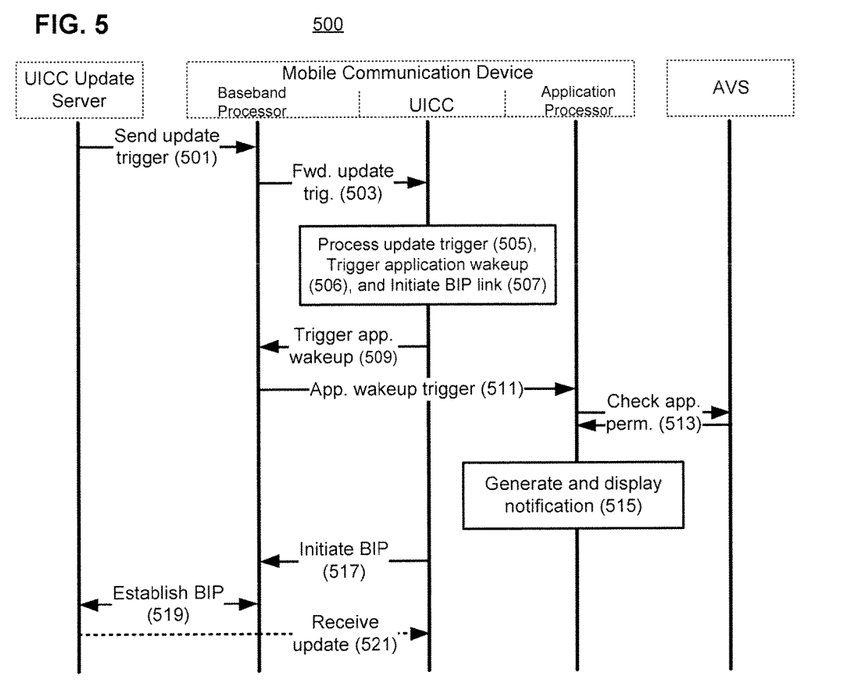
Figure 6:
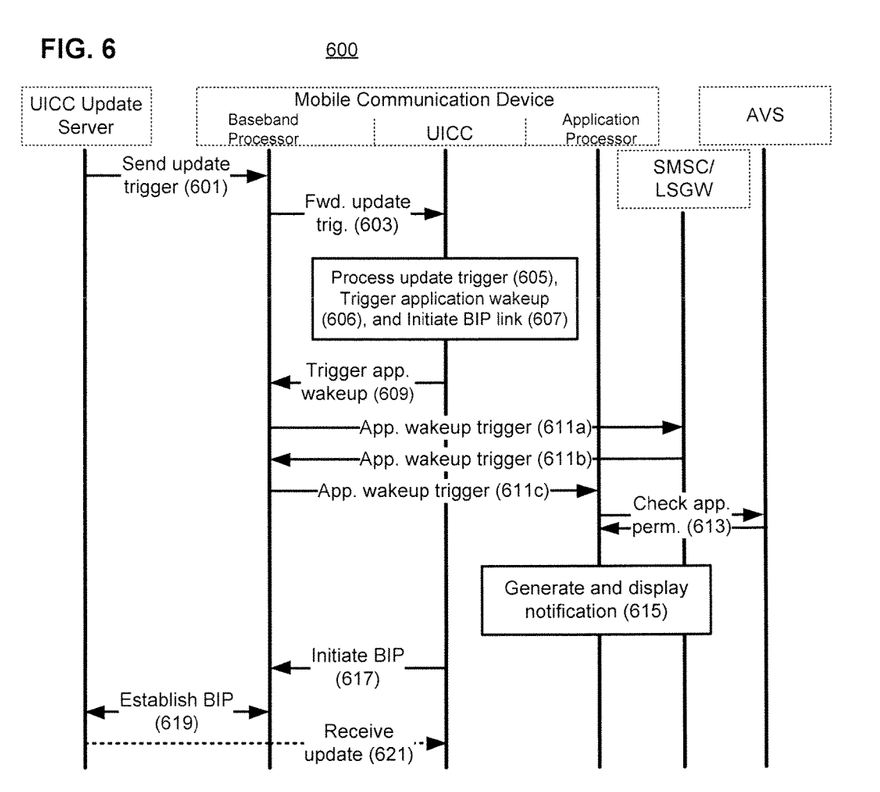

To address the shortcomings in the update procedure of method 300, second, third, and fourth methods 400, 500, and 600 for updating a UICC are presented in relation to FIGS. 4-6, respectively.

FIG. 4 is a communication flow diagram showing communications involved in updating information stored on a UICC 14 according to a second method 400. The method 400 may be used to determine whether a UICC update process is affected by payload corruption, and to prevent errors resulting from payload corruption by configuring the UICC update server 30, the UICC 14, and the mobile communication device 13 to use a proof-of-receipt (POR) procedure to confirm receipt of the update trigger by the UICC 14 and confirm that the received update trigger is not corrupt.

Several steps of method 400 are substantially similar to corresponding steps of method 300, and reference can be made to the corresponding step of method 300 for a detailed description. For example, steps 401-405, 407, and 415-419 of method 400 are substantially similar to steps 301-313 of method 300, and reference can be made to the description of corresponding steps of method 300 for further details.

In the method 400, the receipt of the update trigger in the UICC 14 following step 403 causes the UICC 14 to process the update trigger in step 405, and further causes the UICC 14 to trigger the sending of a response message in step 406. In particular, upon receiving the update trigger in step 403, the UICC 14 processes the received message to identify the received message as an update trigger in step 405. Once the received message is identified as an update trigger, the UICC 14 may further verify the integrity of the update trigger to ensure that the update trigger has not become corrupted and includes adequate information to establish the BIP link and receive the update of UICC operational data in steps 407 and 415-419.

The UICC 14 further in steps 406 and 409 triggers the sending of a response message to the UICC update server 30 confirming receipt of the update trigger and confirming that the update trigger did not suffer from detectable corruption. In the example of FIG. 4, the response message is an SMS message, and an applet of the UICC 14 causes the baseband processor of the transceiver 108 to send the response SMS across the mobile wireless network 15 to the UICC update server 30 via the SMSC/LSGW 31 in steps 409 and 411. In other embodiments, other messaging protocols can be used to send the response message in steps 409 and 411. The response message includes identification of the update trigger responsive to which it was transmitted, and identification of the mobile device the response message was transmitted from. In step 413, the SMSC/LSGW 31 forwards the received response message to the UICC update server 30. The UICC update server 30 can then confirm that the update trigger was successfully received by the mobile device 13, successfully forwarded to the UICC 14, and successfully processed by the UICC 14 to cause the response message to be transmitted.

In cases in which the UICC update server 30 does not receive the receipt confirmation in step 413 within a predetermined period of time following transmission of the update trigger (of step 401), the UICC update server 30 may automatically re-try transmitting the update trigger of step 401 after the predetermined period of time has elapsed. Alternatively or additionally, the UICC update server 30 may notify a mobile network operator and/or a user of the mobile device 15 on which the update failed of the failure to update the UICC 14.

The proof-of-receipt provided by the method 400 further enables the UICC update server 30 to confirm the integrity of the update trigger transmitted to the UICC 14, since a response message is generally not provided in cases in which the update trigger received by the UICC has been corrupted.

FIG. 5 is a communication flow diagram showing communications involved in updating information stored on a UICC 14 according to a third method 500. The method 500 may be used to provide a user of a mobile wireless communication device 13 with a notification regarding a UICC update procedure, in order to notify the user of any failure to activate or update the UICC that may affect the user's ability to use the device 13 for certain functions (e.g., preventing the user from using mobile payment functionalities that would have been enabled by updated mobile payment information, preventing the user from roaming that would have been enabled by receipt of an updated roaming list, or the like).

Several steps of method 500 are similar to corresponding steps of method 300, and reference can be made to the corresponding step of method 300 for a detailed description. For example, steps 501-505, 507, and 517-521 of method 500 may be substantially similar to steps 301-313 of method 300, and reference can be made to the description of corresponding steps of method 300 for further details.

In the method 500, the receipt of the update trigger in the UICC 14 following step 503 causes the UICC 14 to process the update trigger in step 505, and further causes the UICC 14 to trigger an application wakeup in step 506. In particular, upon receiving the update trigger in step 503, the UICC 14 processes the received message to identify the received message as an update trigger in step 505. Once the received message is identified as an update trigger, the UICC 14 may further verify the integrity of the update trigger to ensure that the update trigger has not become corrupted and includes adequate information to establish the BIP link and receive the updated UICC operational data in steps 507 and 517-521.

The UICC 14 further in step 506 processes the update trigger to identify one or more programs associated with the update trigger. In this regard, the update trigger will generally identify operational data or other information that is to be included in the update to the UICC 14. For example, the update trigger may indicate that an MDN/MIN/IMSI/MSISDN will be updated; that a mobile communication authentication applet will be updated; that a roaming list will be updated; that updated mobile payment information will be provided; that a mobile payment applet will be updated; or the like. The UICC 14 stores a mapping between update trigger identifiers and mobile device applications associated with each identifier, for example by including the trigger identifier in the manifest file of the device application. The mapping can further be between update trigger identifiers and applets executing on the UICC 14, and the applets may themselves each be associated with one or more mobile device applications. In one example, the mapping can thus associate an update trigger identifier relating to updating of the UICC's mobile payment information with one or more mobile payment applications (and/or with a mobile payment applet executing on the UICC 14), while associating an update trigger identifier relating to updating a roaming list with one or more international travel applications.

In operation, upon receipt of the update trigger, the UICC 14 in step 506 retrieves from the update trigger the identifier, and begins execution of one or more applets that are associated with the retrieved identifier in the mapping. In turn, each executed applet causes the UICC 14 to trigger wakeup of one or more applications installed on the mobile device 15 by transmitting a response message in step 509. In one example, each executed applet causes the baseband processor of the transceiver 108 to generate and send a separate SMS to each application to be woken up and executed on the microprocessor 112 in step 511. Each SMS may include a header having a specific format including an identifier for the application to be woken up and a payload for processing by the application. For example, the wakeup may have the syntax: //VZW<app-prefix>:<payload> where "//VZW" is a code identifying the message as an application wakeup message, "app-prefix" is an identifier identifying one particular mobile device application, and "payload" is information to be communicated to the mobile device application being woken up. In cases in which multiple applications are to be woken up, multiple SMS messages are sent (e.g., one SMS per application to be woken up). The payload of each application wakeup trigger can be generated by the corresponding applet, and can indicate the status of the UICC updating process.

In response to each application wakeup trigger received in step 509, the baseband processor causes the application wakeup trigger to be routed to the application processor (e.g., the microprocessor 112) in step 511. The application processor receives the application wakeup trigger, and optionally verifies the permissions of the application identified in the trigger in step 513. In particular, the application processor identifies the mobile device application associated with the wakeup trigger, and sends a message across network 15 to the AVS server 32 requesting authentication of the application. The AVS server 32 stores a listing of mobile device applications that are authorized for the UICC wakeup/update service, and determines whether the application identified by the application processor in step 513 is included in the listing. The determined status of the application is returned to the application processor across the network 15. If the application is authenticated and authorized for the UICC wakeup/update service, operation proceeds to step 515. In step 515, the mobile device application is executed and provided with the payload of the application wakeup trigger. The payload generally includes information on the status of the UICC update, and the application thus generates and displays a notification in step 515 indicating the status of the UICC update to a user of the mobile device 13. The notification can alternatively or additionally be stored in a log file. If the application cannot be authenticated in step 513 or is not authorized for the UICC wakeup/update service, execution of the mobile device application is not triggered and step 515 is not performed. Steps 511, 513, and 515 may be repeated for each distinct application wakeup trigger received in step 509 and may thus cause each of a plurality of mobile device applications mapped to the identifier included in the update trigger to be executed in step 515.

The execution of the mobile device application in step 515 may cause a variety of different notifications to be provided to the user in step 515. In situations in which the UICC update procedure is proceeding successfully, the payload of the wakeup trigger may notify the mobile device application in step 515 of the successful update. In response to the update, the mobile device application may take advantage of the updated UICC configuration or capability, for example by providing mobile payment opportunities using a newly updated payment card (e.g., in the case of a UICC update pertaining to mobile payment capabilities) or by providing mobile communications across the network of a roaming partner carrier (e.g., in the case of a UICC update pertaining to a roaming list). In situations in which the UICC update procedure is not proceeding successfully, the payload of the wakeup trigger may notify the mobile device application in step 515 of one or more problems encountered during the update process. In response to the notification, the mobile device application may display an error for the user, and/or may communicate with the UICC update server 30 or other service provider server in view of notifying an appropriate entity of the error or failure.

Similarly to method 300, the receipt of the update trigger in steps 501-505 is also used to trigger the establishment of a BIP link in steps 507 and 517-521. The BIP link is used to receive the updated operational data from the UICC update server 30, and to provide the updated operational data to the UICC 14.

In some mobile communication devices 15, the baseband processor may not be configured to send the application wakeup trigger directly to the applications executing on the application processor in step 511. In such situations, method 500 may be modified as shown in FIG. 6 and described below.

FIG. 6 shows a communication flow diagram showing communications involved in updating information stored on a UICC 14 according to a fourth method 600. The method 600 is substantially similar to method 500 with the exception of steps 511 and 611*a,b,c*. Reference can thus be made to the corresponding steps of method 500 for a detailed description.

In the case of step 511, the application wakeup trigger is communicated from the baseband processor directly to the application processor of the mobile device 15. However, in some mobile device, the baseband processor may not be configured to forward messages received from the UICC 14 directly to the application processor. In such mobile devices, the method of 600 is used. In method 600, the baseband processor in step 611*a* transmits the application wakeup trigger to the SMSC/LSGW 31, and the SMSC/LSGW 31 routes the application wakeup trigger back to the mobile communication device in step 611*b* based on a destination address of the application wakeup trigger. In turn, in response to receiving the application wakeup trigger from the SMSC/LSGW 31, the baseband processor forwards the application wakeup trigger received from the SMSC/LSGW 31 to the application processor in step 611*c* for routing to the application identified in the header of the wakeup trigger message. Processing proceeds in steps 613 and 615 substantially similarly to the description of steps 513 and 515 above.

The various methods described separately herein and relating to the enhanced UICC update can be combined. For example, the method 400 can be combined with method 500 or method 600 to provide both a proof-of-receipt and an application wakeup trigger. In such an example, receipt of the update trigger will cause a response SMS to be transmitted in step 411 as well as an application wakeup trigger to be transmitted in step 511 or steps 611*a-c*.

Additionally, while the application wakeup trigger and associated notification information included in the payload is shown in methods 500 and 600 as being provided to the application processor (e.g., in steps 511/611*a-c*) prior to the UICC update being received across the BIP link (e.g., in steps 521/621), the order of these steps can be changed in some embodiments. Alternatively, an additional notification can be provided via an application wakeup trigger from the UICC 14 to the application processor following steps 521 or 621 (e.g., by repeating steps 506 and 509-515 following completion of step 521). In such embodiments, the notification provided following steps 521 or 621 may include, in the payload, information for the mobile device application indicating whether the UICC update was successfully completed in step 521/621, or providing information on a failed or incomplete UICC update if the update was not successfully completed in step 521/621. In response to receiving the notification in the application processor, the mobile device application may notify the user of the mobile device 15 that the UICC update was successful and/or provide services to the user using the updated UICC operational data. Alternatively, if the UICC update was not successful, the notification provided by the mobile device application to the user of the mobile device 15 may reflect the fact that the UICC update was not successful.

As noted above, the application wakeup trigger of steps 506, 509, and 511 includes a payload that has information to be communicated to the mobile device application being woken up—such as information on the status of a UICC update procedure. In one example, the payload has the following format: <1 byte status code><1 byte number of commands executed><2 bytes last executed command status word><5 bytes counter>. According to this example payload format, an SMS wakeup message indicating successful processing can take the form: <00><01><90 00><00 00 00 00 00> to indicate that <PoR ok><1 command executed><status word 90 00><counter 0>. In the case of an SMS wakeup message indicating unsuccessful processing (e.g., failed security check), the payload format can take the form: <01>< >< ><00 00 00 00 00> to indicate that <RC/CC/DS failed><no command executed><no status word><counter 0>.

As shown by the above discussion, functions relating to the an enhanced UICC update service may be implemented on computers connected for data communication via the components of a packet data network, operating as a UICC update server 30 and/or as a mobile communication device 15 as shown in FIG. 1. Although special purpose devices may be used, such devices also may be implemented using one or more hardware platforms intended to represent a general class of data processing device commonly used to run "server" or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the UICC update. The software code is executable by the general-purpose computer that functions as the UICC update server 30 and/or that functions as a mobile communication device 15. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for updating UICC operational data in essentially the manner performed in the implementations discussed and illustrated herein.

Figures 7, 8:
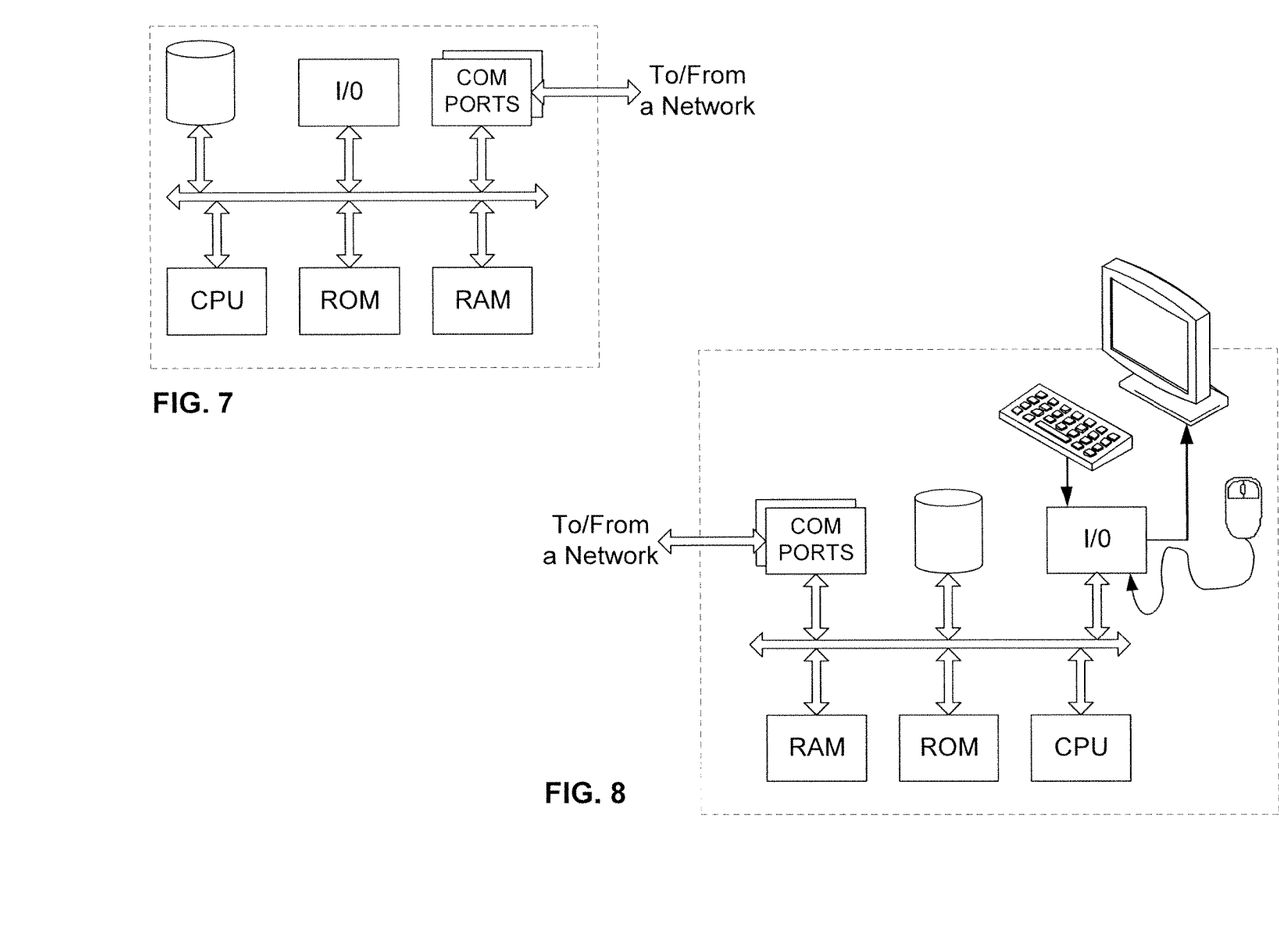
FIG. 7 is a simplified functional block diagram of a computer that may be configured as a host or server, for example, to function as the UICC update server in the system of FIG. 1.
FIG. 8 is a simplified functional block diagram of a personal computer or other work station or communication device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

Hence, aspects of the methods for providing enhanced UICC update services outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the UICC update server 30 or of the mobile device 15. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   receiving, in a mobile communication device across a mobile wireless communication network, a message for triggering an update of data stored in a universal integrated circuit card (UICC);
   forwarding to a UICC of the mobile communication device the message for triggering the update;
   receiving from the UICC a response message relating to the triggering of the update of data stored in the UICC, the response message identifying the message for triggering the update: and
   responsive to the receiving of the response message, generating and transmitting across the mobile wireless communication network a short message service (SMS) message identifying the message for triggering the update.

2. The method of claim 1, wherein the SMS message transmitted across the mobile wireless communication network is a proof-of-receipt message corresponding to the message for triggering the update.

3. The method of claim 2, wherein the message for triggering the update is received from a UICC update server, and wherein transmitting the SMS message identifying the message for triggering the update includes transmitting said SMS message across the mobile wireless communication network to the UICC update server from which the message for triggering the update is received.

4. The method of claim 1, further comprising:
   responsive to the forwarding, receiving from the UICC a request to initiate a communication with a UICC update server;
   responsive to receiving from the UICC the request to initiate the communication with the UICC update server, establishing a bearer independent protocol (BIP) communication link across the mobile wireless communication network with the UICC update server; and
   receiving across the BIP communication link the update of data for the UICC.

5. The method of claim 4, further comprising: forwarding the update of data for the UICC to the UICC of the mobile communication device.

6. The method of claim 4, wherein establishing the BIP communication link across the mobile wireless communication network is independent of the transmitting of the SMS message identifying the message for triggering the update.

7. The method of claim 1, wherein the update of data stored in the UICC includes an update to a roaming list for use by the mobile communication device in selecting a mobile wireless communication network among a plurality of mobile wireless communication networks through which to communicate.

8. The method of claim 1, wherein the update of data stored in the UICC includes data for use in effecting a mobile payment using the mobile communication device and the UICC.

9. A mobile communication device comprising:
   a mobile wireless transceiver configured to communicate across a mobile wireless communication network;
   a universal integrated circuit card (UICC) communicatively connected to the mobile wireless transceiver and configured to authenticate the mobile communication device for communication across the mobile wireless communication network;
   a user input/output interface including a display for user output; and
   a processor communicatively connected to the mobile wireless transceiver, the UICC, and the user input/output interface, and configured to execute one or more application programs enabling users to send and receive communications across the mobile wireless communication network,
   wherein the mobile wireless transceiver is configured to perform functions including functions to:
   receive from the mobile wireless communication network a message for triggering an update of data stored in the UICC;
   forward to the UICC of the mobile communication device the message for triggering the update;
   receive from the UICC a response message relating to the triggering of the update of data stored in the UICC, the response message identifying the message for triggering the update; and
   responsive to receiving the response message, transmit across the mobile wireless communication network a short message service (SMS) message identifying the message for triggering the update.

10. The mobile communication device of claim 9, wherein the SMS message transmitted across the mobile wireless communication network is a proof-of-receipt message corresponding to the message for triggering the update.

11. The mobile communication device of claim 10, wherein the mobile wireless transceiver is further configured to receive, from a UICC update server, the message for triggering the update, and wherein the mobile wireless transceiver is further configured such that transmit the SMS message identifying the message for triggering the update includes transmit said SMS message across the mobile wireless communication network to the UICC update server from which the mobile wireless transceiver receives the message for triggering the update.

12. The mobile communication device of claim 9, wherein the mobile wireless transceiver is further configured to perform functions to:
  responsive to forwarding to the UICC the message for triggering the update, receive from the UICC a request to initiate a communication with a UICC update server;
  responsive to receiving from the UICC the request to initiate the communication with the UICC update server, establish a bearer independent protocol (BIP) communication link across the mobile wireless communication network with the UICC update server; and
  receive across the BIP communication link the update of data for the UICC.

13. The mobile communication device of claim 12, wherein the mobile wireless transceiver is further configured to perform a function to: forward the update of data for the UICC to the UICC of the mobile communication device.

14. The mobile communication device of claim 12, wherein the function to establish the BIP communication link across the mobile wireless communication network is independent of the function to transmit the SMS message identifying the message for triggering the update.

15. The mobile communication device of claim 9, wherein the update of data stored in the UICC includes an update to a roaming list for use by the mobile communication device in selecting a mobile wireless communication network among a plurality of mobile wireless communication networks through which to communicate.

16. The mobile communication device of claim 9, wherein the update of data stored in the UICC includes data for use in effecting a mobile payment using the mobile communication device and the UICC.

* * * * *